United States Patent [19]
Rege

[11] Patent Number: 6,128,467
[45] Date of Patent: Oct. 3, 2000

[54] CROSSPOINT SWITCHED MULTIMEDIA SYSTEM

[75] Inventor: Satish Laxmanrao Rege, Groton, Mass.

[73] Assignee: Compaq Computer Corporation, Houston, Tex.

[21] Appl. No.: 08/619,377

[22] Filed: Mar. 21, 1996

[51] Int. Cl.$^7$ ............................ H04N 7/10; H04N 7/14
[52] U.S. Cl. ...................... 455/4.2; 455/3.1; 455/5.1; 348/6; 348/7; 348/12; 348/13; 395/200.49
[58] Field of Search ................. 348/6, 7, 12, 13, 348/16, 17; 455/4.2, 5.1, 3.1; 395/200.3, 200.33, 200.47, 200.49, 311, 200.42, 200.43, 200.44, 200.48

[56] References Cited

U.S. PATENT DOCUMENTS

| | | | |
|---|---|---|---|
| 5,539,448 | 7/1996 | Verhille et al. | 348/7 |
| 5,539,660 | 7/1996 | Blair et al. | 348/7 |
| 5,548,724 | 8/1996 | Akizawa et al. | 395/200.33 |
| 5,561,637 | 10/1996 | Dan et al. | 348/7 |
| 5,572,517 | 11/1996 | Safadi | 348/12 |
| 5,608,448 | 3/1997 | Smoral et al. | 348/12 |
| 5,612,897 | 3/1997 | Rege | 395/806 |
| 5,625,405 | 4/1997 | DuLac et al. | 455/5.1 |
| 5,630,007 | 5/1997 | Kobayashi et al. | 348/7 |
| 5,642,151 | 6/1997 | Nusbickel | 455/5.1 |
| 5,675,738 | 10/1997 | Suzuki et al. | 395/200.49 |
| 5,712,976 | 1/1998 | Falcon, Jr. et al. | 395/200.47 |
| 5,720,037 | 2/1998 | Biliris et al. | 348/13 |
| 5,756,280 | 5/1998 | Soora et al. | 455/4.2 |
| 5,761,663 | 6/1998 | Lagarde et al. | 395/200.33 |

*Primary Examiner*—John K. Peng
*Assistant Examiner*—Linus H. Lo
*Attorney, Agent, or Firm*—Sharp,Comfort & Merrett, P.C.

[57] ABSTRACT

A multimedia system for delivering multimedia content to customer premises equipment via a circuit of a communications network includes a plurality of servers connected to a plurality of disk systems by a switch and a local area network. The switch includes an arbiter and a plurality of switching elements connected as a crosspoint mesh. Each switching element includes one or more gates and a register connected to a first input of each gate. The arbiter can set the registers to a logical one to allow selected multimedia content to flow through the gate either from the disk systems to the servers, or from the servers to the disk systems in response to customer demands. The local area network is used to transport switching messages from the servers and the disk systems to the arbiter.

17 Claims, 10 Drawing Sheets

CROSSPOINT SWITCHED MULTIMEDIA SYSTEM

FIELD OF THE INVENTION

This invention relates generally to computer systems, and more particularly to computer systems for delivering multimedia content on-demand.

BACKGROUND OF THE INVENTION

Servers of a multimedia system have access to pre-stored multimedia content items. Content items can include games, movies, sporting events, advertising, music, files, databases, etc. Typically, the content of the multimedia is encoded as video, audio, text, and images. Digitally encoded signals representing the multimedia content can be stored on magnetic or optical media prior to delivery.

In response to customer demands, the servers can deliver the stored content items as transport streams. The transport streams, according to industry standard encoding, e.g., Motion Picture Expert's Group (MPEG), include a plurality of transport stream (TS) packets. The TS packets of the transport stream can be transported to customer premises equipment via a circuit of a communications network using, for example, asynchronous transfer mode (ATM) communication protocols.

FIG. 1 shows a prior art arrangement of a multimedia system 100. The system 100 includes multimedia servers 121–123 connected to disks 101–103. The disks 101–103 store multimedia content items 111–113. The multimedia servers 121–123 are connected by a bus 130. The servers 121–123 can access the disks 101–103 and format the content 111–113 into a transport stream in real time.

An essential part of the system 100 is a routing switch 140. The switch 140 establishes the "connection" between the servers "playing" the multimedia content items and endpoint customers. This means the switch 140 routes the transport streams via network ports 150 to a communications network 160. Circuits 180 of the communications network 160 are connected to customer premises 170. The premises 170 includes a set-top box 172 and a display device 173, for example a television.

During operation of the system 100, delivery of selected multimedia content item 111 is initiated at the customer premises 170. A customer makes a demand using, for example, a hand held remote control device and the set-top box 172. In response to the demand, the circuit 180 is established between one of the servers 121–123 and the premises 170. The circuit 180 can be physical or virtual. The dotted line 180 generally indicates a possible path travelled by the transport stream from the server 121 to the customer premises 170.

One problem with the prior art arrangement is load balancing. If the selected multimedia item 111 is popular, then it is likely that the server 121 will need to manage a large number of transport streams. However, the server 123 attached to the disk 103 storing a less desirable content item 113 is under utilized. It would be possible to store multiple copies of popular items so that more than one server can create transport streams. However, given that digitized content can consume as much as two to four gigabytes of storage, maintaining several copies of popular content items wastes storage space and increases the cost of the system. In addition, the viewers' preferences as to what is popular at any one time shifts rapidly. This makes it difficult to match up content with servers.

As another problem, the prior art arrangement is prone to single points of failure. Should there be a problem with the disk 101, the server 121, or the switch 180, the performance of the system is severely degraded. For example, failure in the disk 101 or the server 121 makes all the multimedia content stored on the disk 101 unavailable to use. Failure in the switch 140 may incapacitate the entire system.

As yet another problem, it is difficult to scale the system 100 to deliver increasing amounts of content to an increasing number of customers. Distribution of the content over the disks and the servers must be carefully monitored. Dynamically adjusting the arrangement of the content, disks, and servers is difficult and consumes resources. As the load is increased, the system may need to be upgraded to include more processors, or higher-performance processors and larger memories.

Therefore, there is a need for a multimedia delivery system which can dynamically balance the load over all of the resources of the system without a substantial rearrangement of the components. Furthermore, the system should also be tolerant to a single point or multiple points of failure. In addition, the basic building blocks of the system should facilitate simple scaling of the system as the size of the content and the number of customers increase.

SUMMARY OF THE INVENTION

Disclosed is a system for delivering multimedia content items to customer premises equipment via circuits of a communications network. The content items can be movies, databases, music, and so forth. The system is configured as a plurality of substantially identical servers and disk systems connected to each other by a crosspoint switch and a local area network. Each server includes a switch interface for connecting the server to the switch, and a network interface for connecting the server to the communications network. The server may also include other input and output interfaces to connect to peripheral equipment such as terminals, secondary storage, and other networks.

The switch includes an arbiter and a plurality of switching elements connected as a crosspoint mesh. Each switching element includes one or more gates and a register connected to a first input of each gate. The arbiter can set the registers to a logical one to allow selected multimedia content to flow through the gates either from the disk systems to the servers, or from the servers to the disk systems in response to customer demands. The local area network is used to transport switching messages from the servers and the disk systems to the arbiter.

In one aspect of the invention, the disk storage is organized as a hierarchy of redundant arrays of independent disks. This allows for each content item to be distributed substantially equally over all of the available media of the disk systems. In addition, organized as a redundant array, parity nodes and storage node can be included to reconstruct data representing content in case of a media failure.

DETAILED DESCRIPTION OF A PREFERRED EMBODIMENT

Figure 1:
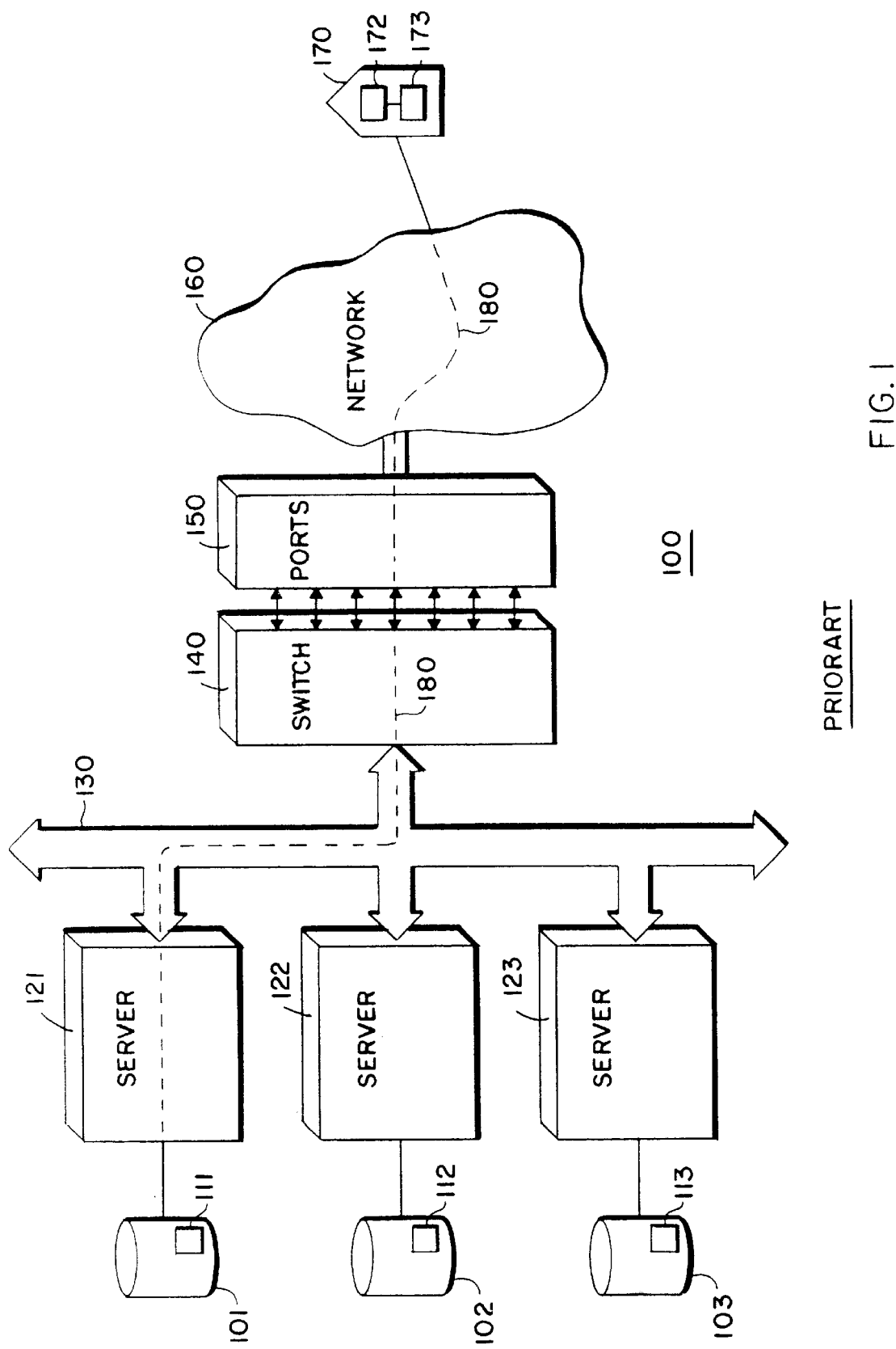
FIG. 1 is a block diagram of an arrangement of a prior art multimedia delivery system.
Figure 2:
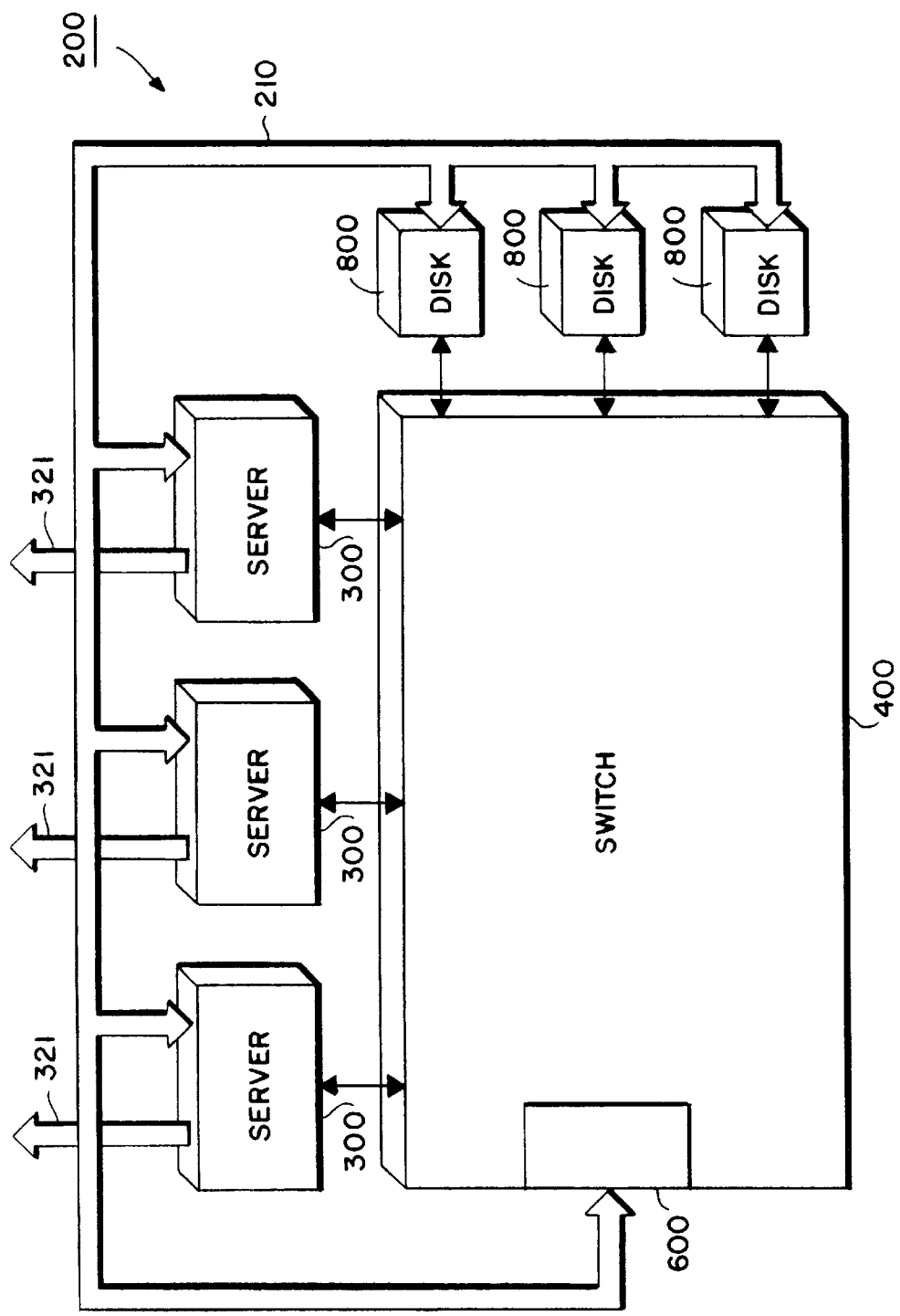
FIG. 2 is a block diagram of multimedia system according to the principles of the invention including servers connected to disk systems by a crosspoint switch and a local area network.

FIG. 2 shows a multimedia delivery system 200 according to a preferred embodiment of the invention. The system 200 comprises a plurality of servers 300 connected by a crosspoint switch 400 and a local area network (LAN) 210 to a plurality of disk storage systems 800. The servers 300 can be connected to the communications network 160 of FIG. 1 by lines 321. The switch 400 includes a request arbiter 600 explained in further detail below. The storage systems 800 can store multimedia content items such as movies, games, music, databases, and so forth.

During operation of the system 200, demands for selected multimedia items are received from customers via the network 160. The servers 300, in response to the demands, generate data requests for the selected items. The requests are forwarded to the storage systems 800. The storage systems transfer the items to the servers 300 via the switch 400. The operation of the switch 400 is controlled by the arbiter 600. The arbiter 600 can receive switching requests via the LAN 210 from both the servers 300 and the disk systems 800. The arbiter 600 ensures that the selected items are appropriately routed between the servers 300 and the disk systems 800. The servers 300, in turn, present the selected items to the network 160 via line 321 to the correct customers.

Figure 3:
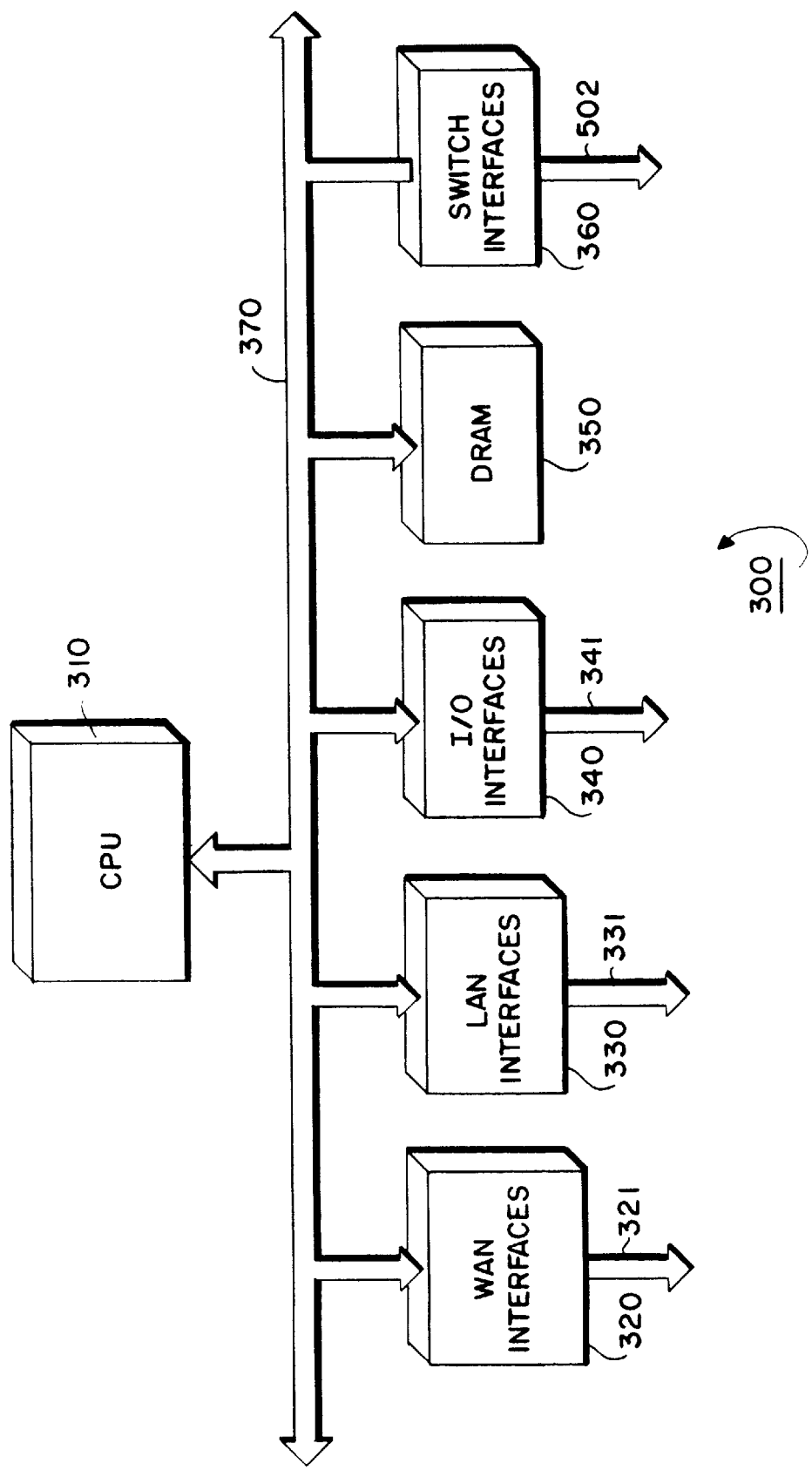
FIG. 3 is a block diagram of the server of the system of FIG. 2.

As shown in FIG. 3, each server 300 includes a processor (CPU) 310, wide area network (WAN) communications network interfaces 320, local area network (LAN) interfaces 330, input/output (I/O) interfaces 340, a dynamically accessible random access memory 350, and switch interfaces 360, all connected to each other by a server bus 370.

The WAN interfaces 320 connect the server 300 to the network 160 of FIG. 1. The LAN interfaces 330 connect the server 300 to the LAN 210 via line 331. The LAN interfaces, in an alternative embodiment, can also be used to connect the servers to the network 160. The I/O interface 340, via line 341, can connect the server 300 to peripheral devices used to control and maintain the server 300, for example, printers, terminals, and local persistent storage via line 341.

The DRAM 350 can store processes and data structures used while the server 300 is operating. For example, the DRAM 350 can store data structures and processes which maintain associations between customers and selected multimedia content items that are being delivered. The switch interfaces 360 can be used to transfer multimedia from the server 300 to the disk storage systems 800.

Figure 4:
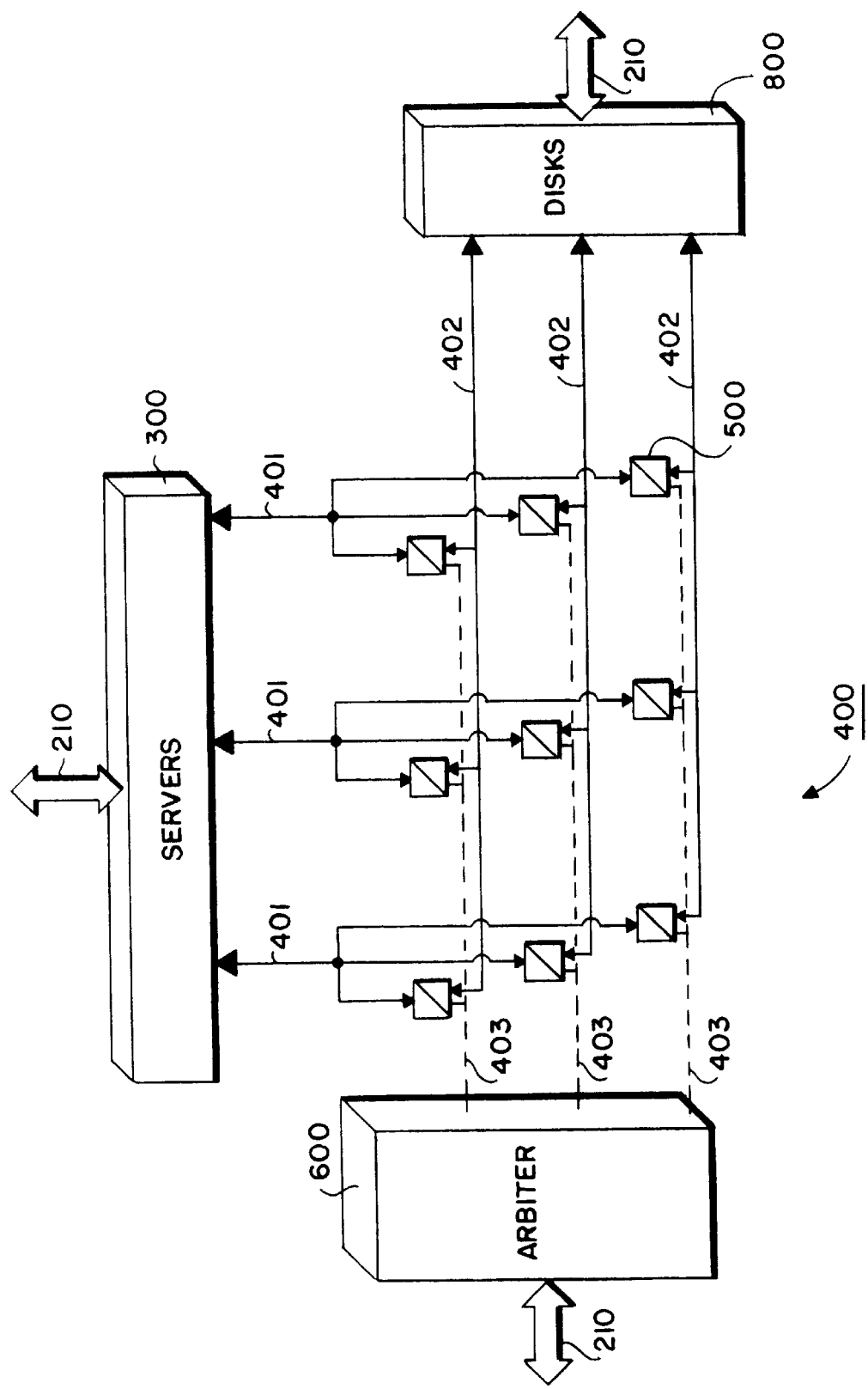
FIG. 4 is a block diagram of the switch of the system of FIG. 2.

As shown in FIG. 4, a preferred embodiment of the switch 400 includes a plurality of switching elements 500 and an arbiter 600. Each switching elements 500 is bi-directional to allow data to be transferred between the servers 300 and to the disk systems 800. The elements 500 are connected as a crosspoint mesh. Lines 401, 402, and lines 403 (dashed) respectively connect the elements 500 to the servers 300, the disks 800, and the arbiter 600.

During operation of the switch 400, the arbiter 600 can selectively connect, based on the switching requests and priority information, any of the servers 300 to any of the disk systems 800.

Figure 5:
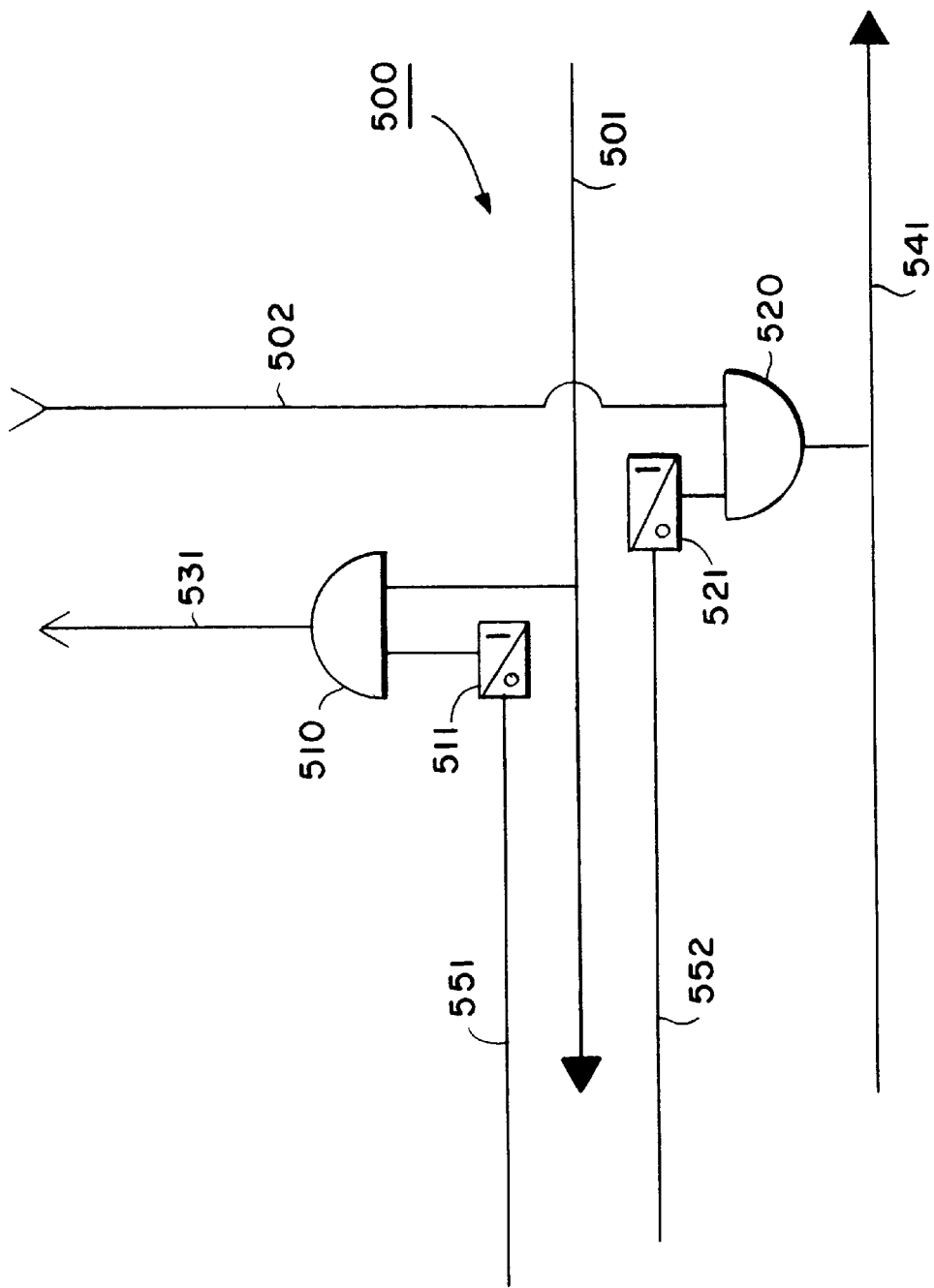
FIG. 5 is a circuit diagram of a switch element of the switch of FIG. 4.

As shown in FIG. 5, each of the plurality of switching element 500 includes a first AND gate 510 and a first register 511, and a second AND gate 520 a second register 521. The first AND gate and register 510–511 route multimedia content from the disk systems 800 to the servers 300. The second AND gate and register 520–521 route multimedia content from the servers 300 to the disk systems 800.

Therefore, the first AND gate 510 has one input connected to an output of a specific one of the disk systems 800 by line 501. The output of the AND gate 510 is connected to an input of a specific one of the servers 300 by line 531. The second AND gate 520 has one input connected to an output of the specific server by line 502, and the output is connected to an input of the specific disk system by line 541. The second inputs of the gates 510 and 520 are respectively connected to registers 511 and 521. The registers can be accessed via lines 551–552 by the arbiter 600.

It should be noted that the lines and components can be configured to carry multiple data signals in parallel. For example, the lines, gates and registers and busses can carry 8, 16, 32, 64, or more bits at the time.

During the operation of the switch element 500, the arbiter 600, in response to switching requests received from the servers 300 or disk systems 800 via the LAN 210 can set the registers 511 and 521 to either a logical zero or one. If a register is set to a logical one, multimedia content is presented at the output of the gates, otherwise, routing of content through the gate is disabled. By selectively setting the registers routing between any server and disk system can be enabled.

Figure 6:
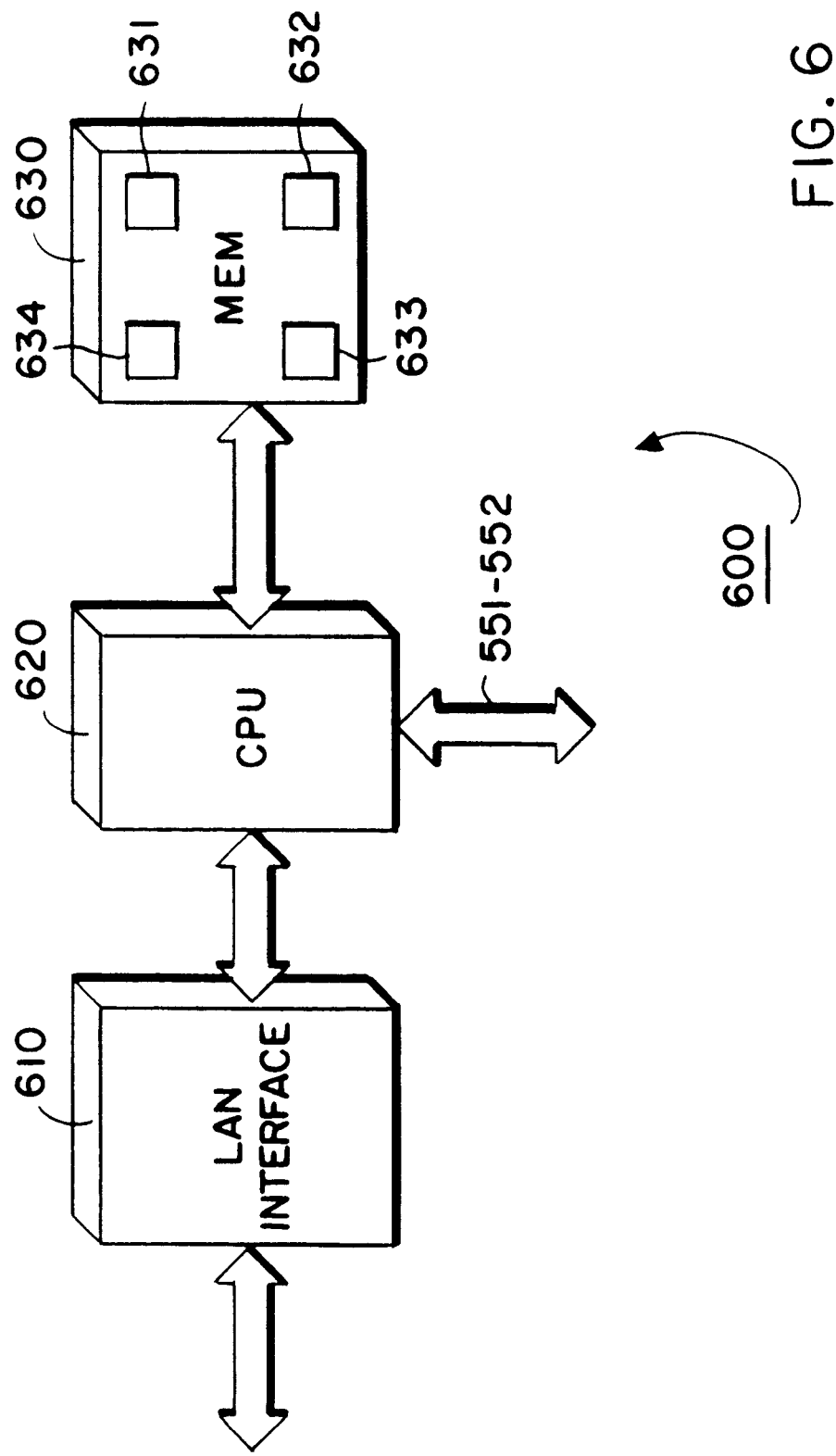
FIG. 6 is a block diagram of an arbiter of the switch of FIG. 4.

FIG. 6 shows a preferred embodiment of the arbiter 600. The arbiter 600 includes a microprocessor 620 connected to a LAN interface 610 and a memory 630. The LAN interface 610 connects the arbiter 600 to the LAN 210. The memory 630 can store software programs 631 which operate on data structures 632–634. In an alternative embodiment the functionality of the arbiter 600 can be implemented with hard-wired logic circuits.

The data structures can include a server queue 632, a disk queue 633, and a state table 634. The server queue 632 stores switching requests generated by the servers 300, and the disk queue 633 stores switching requests generated by the disk systems 800. The state table 634 can maintain a current mapping of "on" and "off" states of the individual switch elements 500. If a switch element is "on," the switch is busy, otherwise the element is free.

In response to the switching requests, the arbiter 600, if possible, sets the appropriate switching elements 500. If the required elements are busy the requests can be queued. After the switching elements 500 have been set via lines 551–552 of FIG. 5, the arbiter 600 can notify the requesting servers 300 or disk systems 800 so that the transfer of content may proceed. Upon completion, the requesting servers or disk systems notifies the arbiter 600 so that the status of the switching elements can be updated in the state table 634. The switching requests can be data messages transported over the LAN 210 using conventional, for example, FDDI or Ethernet protocols.

Figure 7:
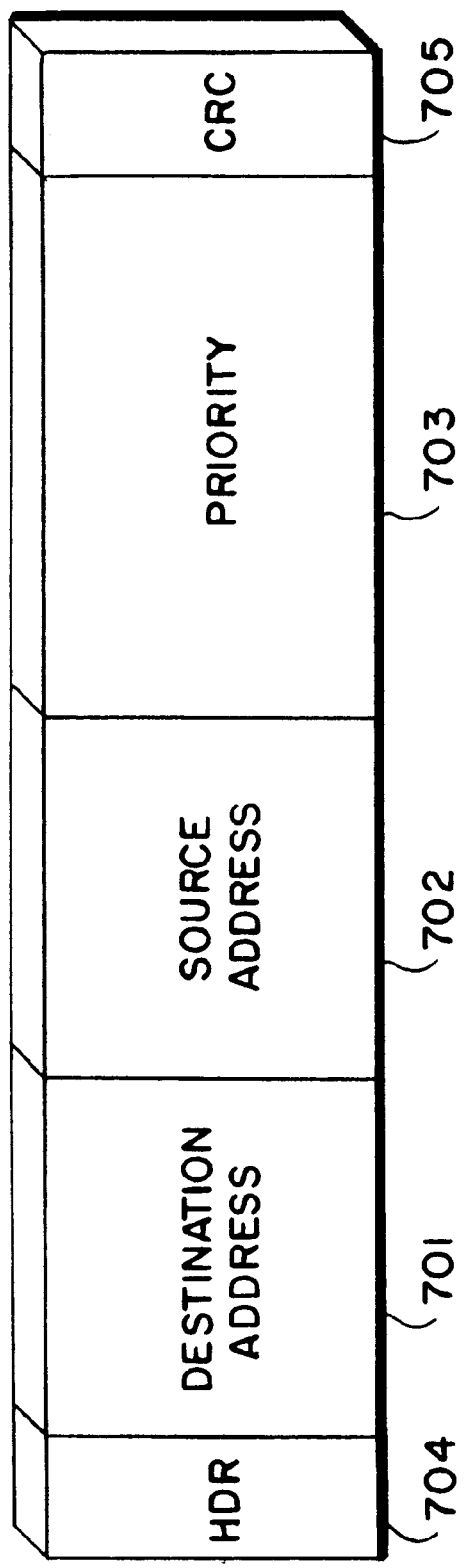
FIG. 7 is a block diagram of a switching request packet processed by the arbiter of FIG. 6.

As shown in FIG. 7, a switching request 700 can include a destination address 701 and a source address 702 of the data being routed. In addition, the switching request 700 can include a priority code 703. The request data 701-703 can be prepended with a header (HDR) 704 to indicates routing information. For example, the header 704 can include the bus address of the arbiter 600. An error correcting code (CRC) 705 can be appended to ensure correct transport of the switching request 700.

Queued requests having a higher priority can be processes ahead of lower priority requests stored in the queues 632–633. The priority algorithms can also include mechanisms to ensure that any request is eventually serviced, no matter what the priority. This means that low priority requests are not held pending indeterminably. Using the source and destination addresses, the arbiter can determine which of the switching elements 500 need to be turned on and off to effect the routing.

Figure 8:
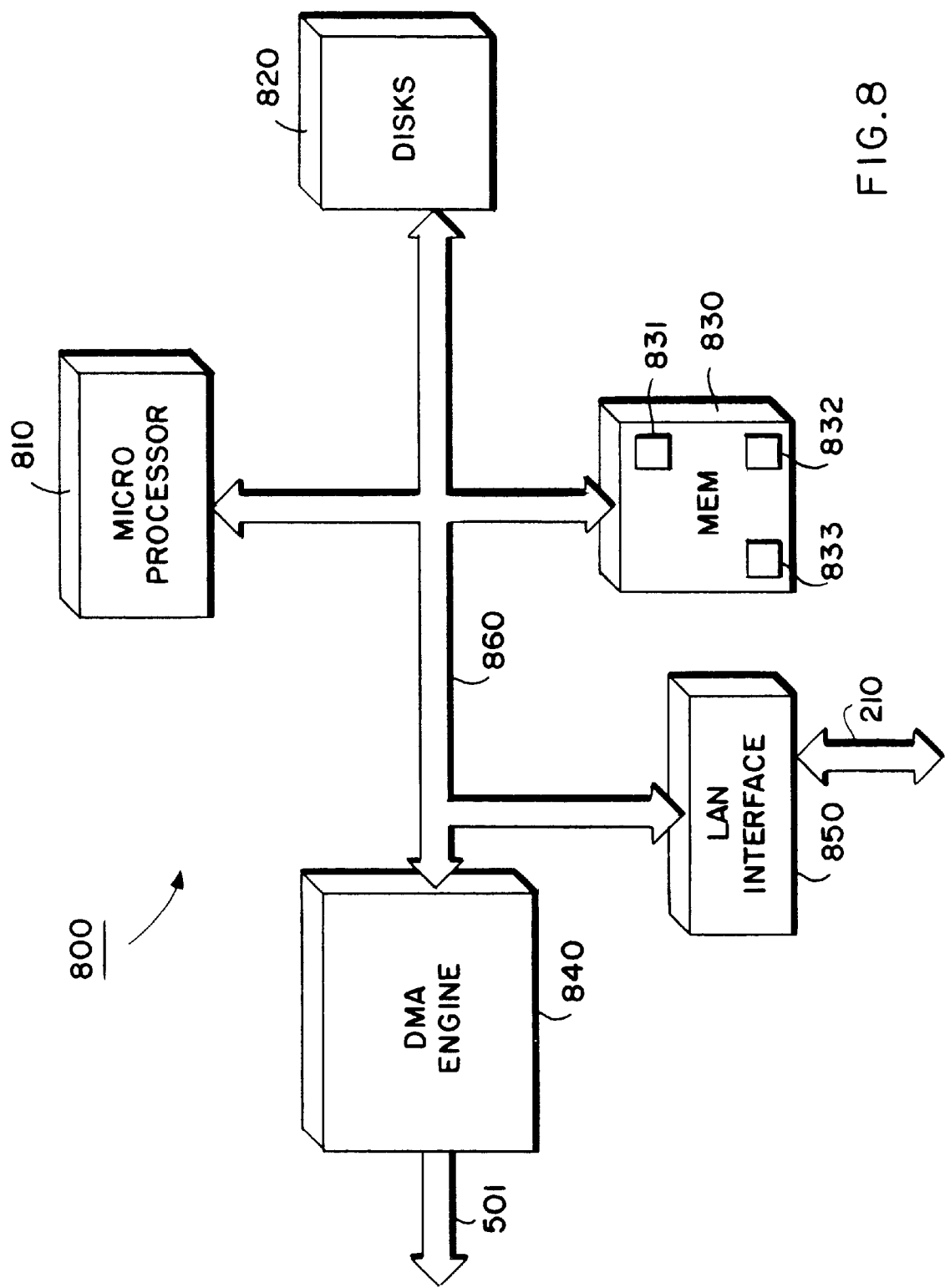
FIG. 8 is a block diagram of the disk systems of FIG. 2.

FIG. 8 shows a preferred embodiment of the disk system 800. The system 800 includes a microprocessor 810, disks 820, DRAM 830, a DMA engine 840, and a LAN interface 850 connected to each other by a disk bus 860. The processor 810 executes processes 831 which can request the reading and writing of multimedia content. The processes 831 can be stored in the memory 830 while the disk system 800 is operating. The disk system pulls data from the DRAM 350 of the servers 300 when writing new content to the disks 820. During the playing, the multimedia content read from the disks 820 is pushed to the DRAM 350 of the servers 300.

The memory 830 can also include buffers 832 to cache data being transferred between the servers 300 and the disk system 800. In addition, the memory 830 can include a disk request queues 833 for outstanding disk I/O requests. There can be one queue for each of the servers 300, or a single queue for all of the servers 300.

Figure 9:
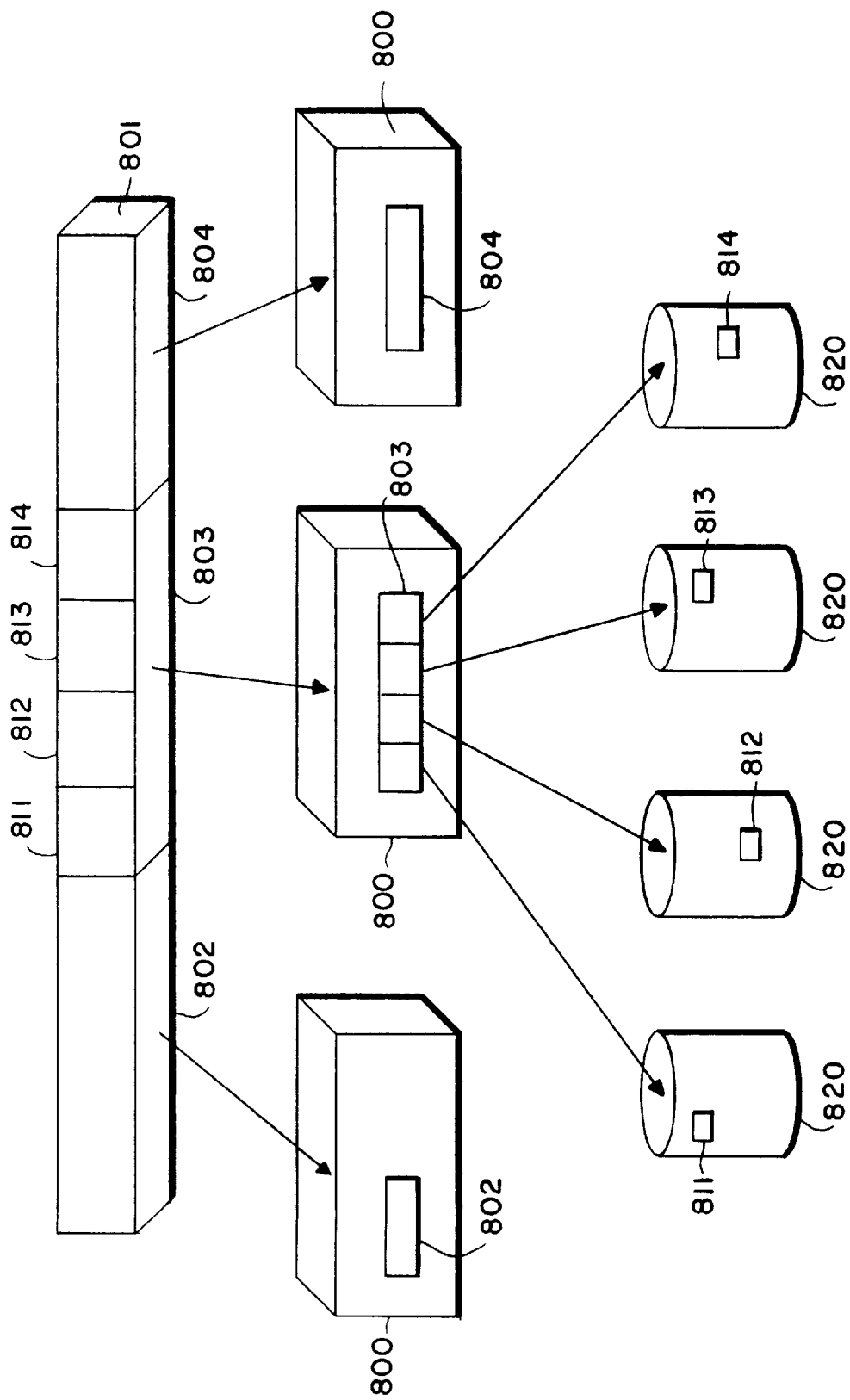
FIG. 9 is a block diagram depicting the distribution of multimedia content items as stripes over the disk of the FIG. 8.

FIG. 9 shows a preferred distribution of content items over the disks systems 800. The disk systems 800 are arranged as a hierarchy of redundant arrays of independent disks, e.g., a RAID type of storage device. In a RAID storage device, the address space of all of the disks 820 form a singular logically contiguous space. In addition, in RAID storage, data integrity is preserved by having some of the disks dedicated to storing parity information. Should there be a failure in any of the disks 820, then the lost data can be reconstructed from the remaining data and the parity information.

As shown, a selected multimedia content item 801, for example a movie, is partitioned into a plurality of stripes 802–804. The stripes of the content item 801 are distributed substantially equally over all of the arrays 800. This means that if the entire movie is played to a customer, each of the disk array systems 800 is responsible for sourcing an equal amount of the content 801. Furthermore, each of the stripes 802–804 is further partitioned into a plurality of sub-stripes, e.g., sub-stripes 811–814. The sub-stripes 811–814 are also distributed substantially equally over all of the disks 820 of a particular array 800.

Hierarchically striping and sub-striping the multimedia items over the disks 820 of the disk systems 800 makes it easy to replace or otherwise maintain the content. The striping also facilitates load balancing during delivery of multimedia content items.

When a customer demands a selected multimedia content item, a particular server 300 is designated the destination server for the selected multimedia content routed from the disk systems 800. This means that the communications network circuit 180 of FIG. 1 exists between the customer premises 170 and the destination server. Since the multimedia items are striped substantially equally over all of the disks 820, it does not matter which server is designated the destination server for the selected content.

Figure 10:
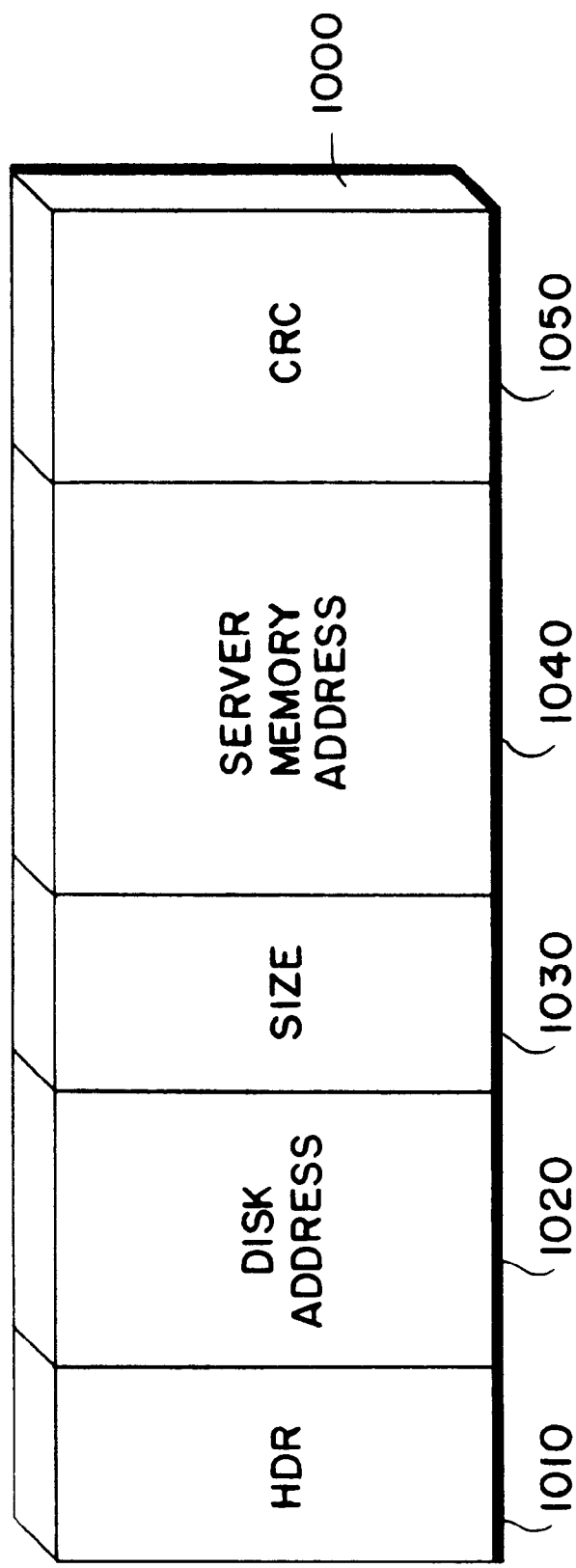
FIG. 10 is block diagram of a data request packet.

FIG. 10 shows a preferred embodiment of a data request packet 1000 generated to initiate a transfer of content from one of the disk systems 800 to one of the servers. The multimedia request packet 1000 includes a header (HDR) 1010, a disk address field 1020, a size field 1030, a server memory address field 1040, and a error correction field (CRC) 1050.

The header 1010 includes LAN address information to send the data request packet 1000 to the correct disk system 800. For example, the information can include the address of the server making the request. The disk address 1020 is the logical address of the portion of the selected multimedia to be transferred to the server 300. The field 1030 indicates the size, for example byte count, of the content being transferred. The server memory address 1040 is a beginning location in the DRAM 350 of the server 300 where the content portion should be stored. The CRC 1050 can be used to ensure that the packet 1000 is delivered correctly.

In response to customer demands, for example a demand for a selected movie, the "destination" server for content generates appropriate data request packets 1000. The packets are preferably routed to one of the disk systems 800 and queued via the LAN 210. Alternatively, the request packet can be routed to the destination via the switch.

The disk system 800 which will source the content extracts the fields 1020, 1030, and 1040 to fetch the data of the content from the attached disks 820. The requested content is buffered in the cache 832. When the routing between the destination server and the sourcing disk system is enabled by the arbiter 600, the DMA engine 840 can push the multimedia content into the memory of the server beginning at the address 1040.

A disk system can have multiple transfer requests outstanding for different servers 300. Thus, should one of the servers be busy, another request can be processed.

The packets 1000 can also include other types of packets, indicating, for example, load information, server, switch and disk failures, rerouting information, priority information, or other positional information necessary for delivery of multimedia content to the customer.

During normal operation, the portions of the selected multimedia content item are accessed sequentially. Should the customer wish to view portions of the content out of their normal sequential order, the destination node, in response to customer initiated demands, e.g., fast-forward, skip, pause, rewind, etc., can formulate other packets 1000 to fetch the portions of the multimedia content in any order from the disk systems 800.

In the case of a failure in one of the disks 820 being used to source the content, the destination server or the RAID disk system 800 can reconstruct any lost portions of the content. The lost portions can be reconstructed from the remaining portions and the parity data stored in the parity disks. Reconstructed content can be routed on the fly as described above. In the case of a failure of one of the servers 300, delivery of the selected content can be assumed by any other surviving server.

In a preferred embodiment of the invention, the arrangement of the servers and disk systems can be changed while the system is operating, that is "on-line." For example, additional rows or columns of switch elements 500 can be assembled and tested as server or disk systems are added. Once the physical connections are confirmed, the arbiter 600 can be updated to indicate the existence of the added components.

In addition, the routing can be modified to allow content to be forwarded to multiple servers 300 by turning on several switch elements 500 in the same row. Then, a single portion of a highly popular content items can be routed to a large number of customers spread over several servers without an undue increase of I/O processing.

In an alternative embodiment, the crosspoint switch 600 can be expanded to operate as a three-dimensional switch by interconnecting additional planes of elements.

It should also be noted that the switch 600 can be used to load or update multimedia content onto the disk systems. In this case, the multimedia flows from the servers 300 to the disk systems 800.

Although the exemplary system delivers multimedia content items to customer premises equipment, such as televisions, via a wide area public access network, the invention can also be used for multimedia presentation in a corporate private network to multimedia workstations.

It is not intended that the present invention be limited to the specific embodiment disclosed in the above description and the associated drawings. Numerous modifications and adaptations of the invention will be apparent to those skilled in the art. Thus, it is intended by the following claims to cover all such modifications and adaptations falling within the scope of the invention.

I claim:

1. An apparatus for delivering multimedia items to customers via a communications network, the apparatus comprising:
    a plurality of computers, each computer coupled to the communications network;
    a plurality of disk systems, each disk system storing at least a portion of a multimedia item;
    a switch coupled between the plurality of computers and the plurality of disk systems, the switch comprising a matrix of selectable switching elements, each switching element coupled between one of the computers and one of the disk systems; and
    a memory to store a state table, the state table storing information providing the state of each of the selectable switches.

2. The apparatus as in claim 1 wherein each computer comprises a processor, a memory, and input/output interfaces coupled to each other and the plurality of disk systems by a computer bus.

3. The apparatus as in claim 1 wherein the switch comprises a crosspoint switch and the selectable switching elements comprise bi-directional switching elements, the switch also including an arbiter coupled to the local area network.

4. An apparatus for delivering multimedia items to customers via a communications network, the apparatus comprising:
    a plurality of computers, each computer coupled to the communications network;
    a plurality of disk systems, each disk system storing a different portion of a selected multimedia item;
    a local area network coupled between the plurality of computers and the plurality of disk systems; and
    a crosspoint switch for routing the different portions between the plurality of computers and the plurality of disk systems, the switch comprising an arbiter coupled to the local area network and a plurality bi-directional switching elements, each of the bi-directional switching elements for connecting one of the plurality of computers to one of the plurality of disk systems, wherein each bi-directional switching element further comprises:
        a first AND gate for transporting data from a selected one of the plurality of computers to a selected one of the plurality of disk systems;
        a second AND gate for transporting data from a selected one of the plurality of disk systems to a selected one of the plurality of computers; and
        each AND gate having a first input coupled to a control register for enabling transport of data through each AND gate, the control register coupled to the arbiter.

5. An apparatus for delivering multimedia items to customers via a communications network, the apparatus comprising:
    a plurality of computers, each computer coupled to the communications network;
    a plurality of disk systems each disk system storing a different portion of a selected multimedia item;
    a local area network coupled between the plurality of computers and the plurality of disk systems; and
    a crosspoint switch for routing the different portions between the plurality of computers and the plurality of disk systems, the switch comprising an arbiter coupled to the local area network and a plurality bi-directional switching elements, each of the bi-directional switching elements for connecting one of the plurality of computers to one of the plurality of disk systems, wherein the arbiter further comprises:
    a local area network interface for receiving control requests from the plurality of computers and the plurality of disk systems;
    an arbiter processor coupled to the control register; and
    a memory, the memory for storing a server queue, a disk queue, and a state table, the state table for storing the ON and OFF states of the plurality of switching elements.

6. The apparatus as in claim 5 wherein each control request comprises:
    a header;
    a destination address;
    a source address; and
    priority information.

7. The apparatus as in claim 1 wherein each of the plurality of disk systems comprises:
    a redundant array of independent disks, and wherein different portions of the multimedia item are distributed substantially equally among the independent disks of the redundant array.

8. A method for delivering multimedia items to customers via a communications network, the method comprising:
    distributing each multimedia item over a plurality of disk systems, each of the disk systems coupled to each of a plurality of servers through a crosspoint switch;
    receiving a customer request for one of the multimedia items;
    controlling the cross-point switch in response the customer request, the crosspoint switch controlled so that one of the servers is coupled to one of the disk systems so that a portion of the requested multimedia item can be transferred to the server;
    connecting the customer provided the customer request to the one of the servers;

fetching, in response to a customer request, a portion of a selected multimedia item from the one of the plurality of disk systems;

routing the portion to a selected one of a plurality of servers via the crosspoint switch;

transferring the multimedia item to the customer.

9. The apparatus as in claim 1 wherein each of the plurality of computers comprises a server.

10. The apparatus as in claim 1 and further comprising a local area network coupled between the plurality of computers and the plurality of disk systems.

11. The apparatus as in claim 1 wherein each of the selectable switches comprises an AND gate, a first input of the AND gate being provided a logic signal as stored in the state table.

12. The apparatus as in claim 11 wherein a second input of the AND gate is coupled to one of the disk systems.

13. The apparatus as in claim 11 wherein the first input of the AND gate is coupled to the output of a control register.

14. The apparatus of claim 1 wherein each of the switches comprises a bi-directional switch, the bi-directional switch comprising:

a first AND gate with a first input coupled to receive state information from the table and the other input coupled to one of the computers; and a second AND gate with a first input coupled to receive state information from the table and the other input coupled to one of the disk systems.

15. The apparatus as in claim 1 wherein the memory further stores a server queue and a disk queue.

16. The apparatus as in claim 1 wherein each disk system stores a different portion of a selected multimedia item.

17. An apparatus for delivering multimedia items to customers via a communications network, the apparatus comprising:

a plurality of computers, each computer coupled to the communications network;

means for storing a plurality of multimedia items, the means for storing including a plurality of independent output channels;

a switch comprising a matrix of selectable switching elements, each switching element coupled between one of the computers and one of the output channels; and means for storing a state table, the state table storing information providing the state of each of the selectable switches.

* * * * *